United States Patent [19]
Forman et al.

[11] Patent Number: 5,692,120
[45] Date of Patent: *Nov. 25, 1997

[54] FAILURE RECOVERY APPARATUS AND METHOD FOR DISTRIBUTED PROCESSING SHARED RESOURCE CONTROL

[75] Inventors: Ira Richard Forman; Hari Haranath Madduri, both of Austin, Tex.

[73] Assignee: International Business Machines Corporation, Armonk, N.Y.

[*] Notice: The term of this patent shall not extend beyond the expiration date of Pat. No. 5,463,733.

[21] Appl. No.: 453,610

[22] Filed: May 30, 1995

Related U.S. Application Data

[62] Division of Ser. No. 287,046, Aug. 8, 1994, Pat. No. 5,463,733.

[51] Int. Cl.⁶ .................................................. G06F 11/00
[52] U.S. Cl. ........................... 395/182.08; 395/729
[58] Field of Search .................. 395/182.08, 182.09, 395/182.02, 182.1

[56] References Cited

U.S. PATENT DOCUMENTS

| | | | |
|---|---|---|---|
| 4,634,110 | 1/1987 | Julich et al. | 371/11 |
| 4,827,399 | 5/1989 | Shibayama | 364/200 |
| 5,003,464 | 3/1991 | Ely et al. | 364/200 |
| 5,058,056 | 10/1991 | Hammer et al. | 364/900 |
| 5,214,778 | 5/1993 | Glider et al. | 395/575 |
| 5,235,700 | 8/1993 | Alaiwan et al. | 395/575 |
| 5,253,359 | 10/1993 | Spix et al. | 395/575 |
| 5,463,733 | 10/1995 | Forman et al. | 395/182.08 |

*Primary Examiner*—Robert W. Beausoliel, Jr.
*Assistant Examiner*—Joseph E. Palys
*Attorney, Agent, or Firm*—Mark S. Walker

[57] ABSTRACT

Communicating the failure of master process controlling one or more shared resources to all processes sharing the resources. A shared resource control file is established that contains the identities of all sharing processes. Master process failure triggers a race to establish exclusive access over the shared control file. The new master reads shadow address data from the old shared control file, marks it as invalid and establishes a new control file based on renewed registrations from the sharing processes. The master process maintains the sharing process list as process begin and end sharing.

3 Claims, 3 Drawing Sheets

FIG. 1

| MACHINE ID | PROCESS ID | PORT NO. | PROTOCOL ID | SHADOW ID | SHADOW COMM |
|---|---|---|---|---|---|
| 222 | 224 | 226 | 228 | SHADOW ID | COMM |
| | | | | SHADOW ID | COMM |
| | | | | SHADOW ID | COMM |
| | | | | SHADOW ID | COMM |
| | | | | SHADOW ID | COMM |

FAILURE RECOVERY APPARATUS AND METHOD FOR DISTRIBUTED PROCESSING SHARED RESOURCE CONTROL

This application is a Division of application Ser. No. 08/287,046, filed Aug. 8, 1994, now U.S. Pat. No. 5,463,733.

BACKGROUND OF THE INVENTION

1. Field of the Invention

The present invention relates to the operation of distributed processing computer systems. In particular it relates to failure recovery in those systems that have a plurality of processing nodes each one having access to a number of shared resources controlled by a master process. Still more particularly, the present invention relates to the management shared access including the passing of a token or write lock that grants permission to one of a number of distributed processes allowing that process to update a data item.

2. Background and Related Art

Distributed computer, systems are created by linking a number of computer systems using a communications network. Distributed systems frequently have the ability to share data resident on an individual system. Sharing can take many forms. Simple file sharing allows any of the distributed processes to access file regardless of the physical system on which they reside. Device sharing similarly allows use of physical devices regardless of location. Replicated data systems implement data sharing by providing a replica copy of a data object to each process using that data object. Replication reduces the access time for each processor by eliminating the need to send messages over the network to retrieve and supply the necessary data. A replicated object is a logical unit of data existing in one of the computer systems but physically replicated to multiple distributed computer systems. Replicated copies are typically maintained in the memories of the distributed systems.

Replicated data objects also speed the update process by allowing immediate local update of a data object. Replication introduces a control problem, however, because many copies of the data object exist. The distributed system must have some means for controlling data update to ensure that all copies of the data remain consistent.

Prior art systems control data consistency by establishing a master data object copy in one of the distributed systems. The master copy is always assumed to be valid. Data object update by a system other than that of the master copy requires sending of the update request to the master for update and propagation to all replicas. This approach has the disadvantage of slowing local response time as the master data object update and propagation are performed.

Another means for controlling replicated data is described in *Moving Write Lock for Replicated Objects*, commonly assigned, filed on Oct. 16, 1992 as Ser. No. 07/961,757 and having attorney docket number AT992-046. The apparatus and method of that invention require that a single "write lock" exist in a distributed system and be passed to each process on request. Data object updates can only be performed by the holder of the "write lock." The "write lock" holder may update the local object copy and then send that update to the master processor for its update and propagation to other processes. The above patent application is incorporated by reference.

The method for determining which of a number of distributed processes is to be master is described in pending patent application Ser. No. 07/961,750 filed Oct. 16, 1992 and entitled *Determining a Winner of a Race in a Data Processing System*, commonly assigned and bearing attorney docket number AT992-117. The "race" between each process potentially controlling a resource results in the assignment of master status to the process first establishing write control over a Share Control File. Once control has been established by one process, other processes are assigned "shadow" status. Master process failure causes reevaluation of master status. This patent application is also incorporated by reference.

The technical problem addressed by the present invention is providing fault tolerant features to a distributed processing system controlling resource sharing by designating a master process for each shared resource. The problem of systems using write locks or tokens to manage replicated data objects is also addressed. Fault tolerance is required to ensure that no data or updates are lost due to the failure of a master process. Prior art systems, including those referenced above, require the master determination and write lock control to be reinitialized. This could result in loss of data if a locally updated data object replica has not been propagated to the master or other replicas.

SUMMARY OF THE INVENTION

The present invention is directed to an improved system and method for managing write locks in distributed processing systems. The present invention improves on failure notification in a distributed environment by notifying all shadow processes of the failure. Notification is accomplished by having each master collect the names of all shadow processes and causing a new master to notify all previously logged shadows of the changed master status.

The present invention offers an improved system and method for recovering from master failure in a write lock control system. The present invention is directed to a system and method that ensures the designation of a new master considers data integrity by determining which of the shadow processes has the most current data object and attempting to make that shadow the master.

The present invention is directed to a method of managing recovery of a distributed processing system in which shared resources are a each controlled by a master process, the distributed processing system having a plurality of processors, each of said processors having memory and each of said processors interconnected to the other processors by means of a communications network. The method comprises detecting failure of a master process for a shared resource; requesting exclusive access to a shared resource control file; establishing exclusive access to said shared resource control file, if said request is granted; determining from said control file the communications addresses of all other processes accessing said shared resource via the failed master process; sending a message to each of said other processes indicating failure of said master process.

It is therefore an object of the present invention to provide a fault-tolerant distributed system having replicated data objects.

It is another object of the invention to manage new master process "race" conditions to ensure that master process designation does not result in loss of data.

It is yet another object of the invention to ensure failure of a master process for a given data object is detected by all shadow processes having replicas of that data object.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

The present invention is practiced in a distributed processing computer environment. This environment consists of a number of computer processors linked together by a communications network. Alternatively, the present invention could be practiced in a multiprogramming system in which a single computer (e.g. single CPU) supports the execution of multiple processes each having a separate address space.

Figure 1:
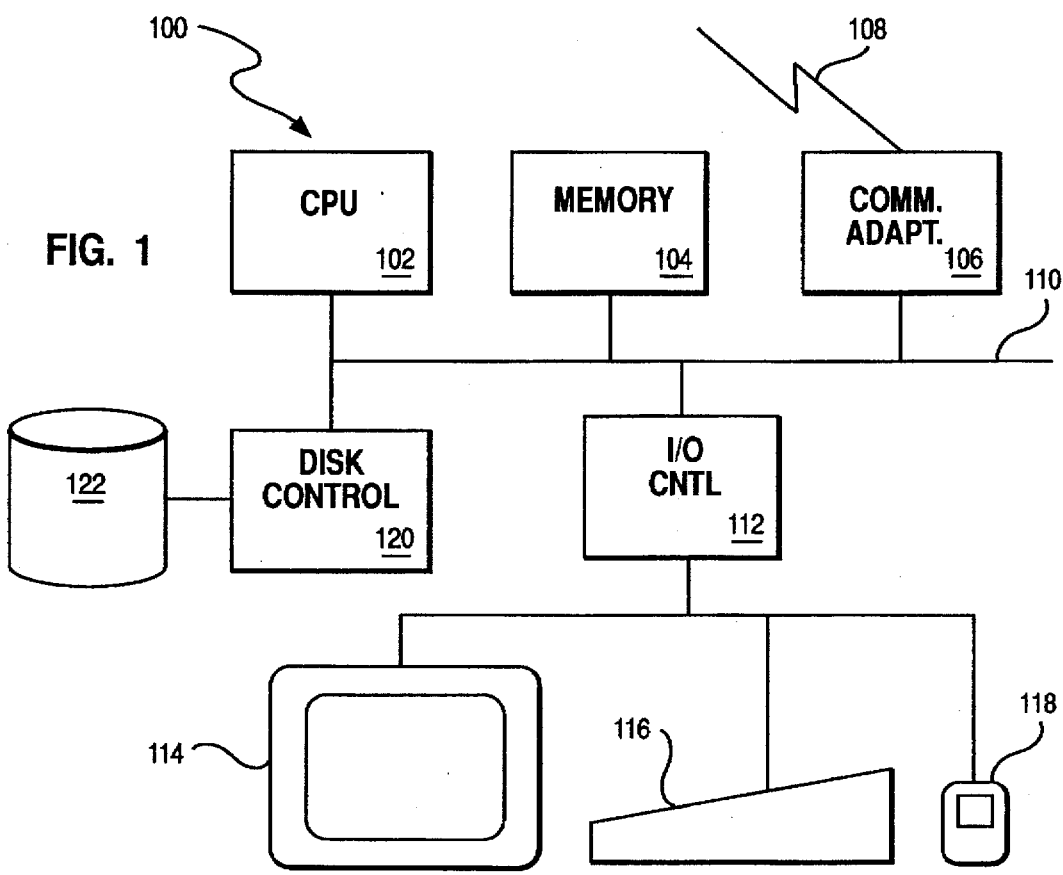
FIG. 1 is a block diagram of a computer system of the type in which the present invention is embodied.

The preferred embodiment is practiced with linked computers. Each computer has the components shown generally for the system 100 in FIG. 1. Processing is provided by central processing unit or CPU 102. CPU 102 acts on instructions and data stored in random access memory 104. Long term storage is provided on one or more disks 122 operated by disk controller 120. A variety of other storage media could be employed including tape, CD-ROM, or WORM drives. Removable storage media may also be provided to store data or computer process instructions. Operators communicate with the system through I/O devices controlled by I/O controller 112. Display 114 presents data to the operator while keyboard 114 and pointing device 118 allow the operator to direct the computer system. Communications adapter 106 controls communications between this processing unit and others on a network to which it connected by network interface 108.

Computer system 100 can be any known computer system including microcomputers, mini-computers and mainframe computers. The preferred embodiment envisions the use of computer systems such as the IBM Personal System/2 (PS/2) or IBM RISC System/6000 families of computers. (IBM, Personal System/2, PS/2 and RISC System/6000 are trademarks of the IBM Corp.) However, workstations from other vendors such as Sun or Hewlett Packard may be used, as well as computers from Compaq or Apple.

Figure 2:
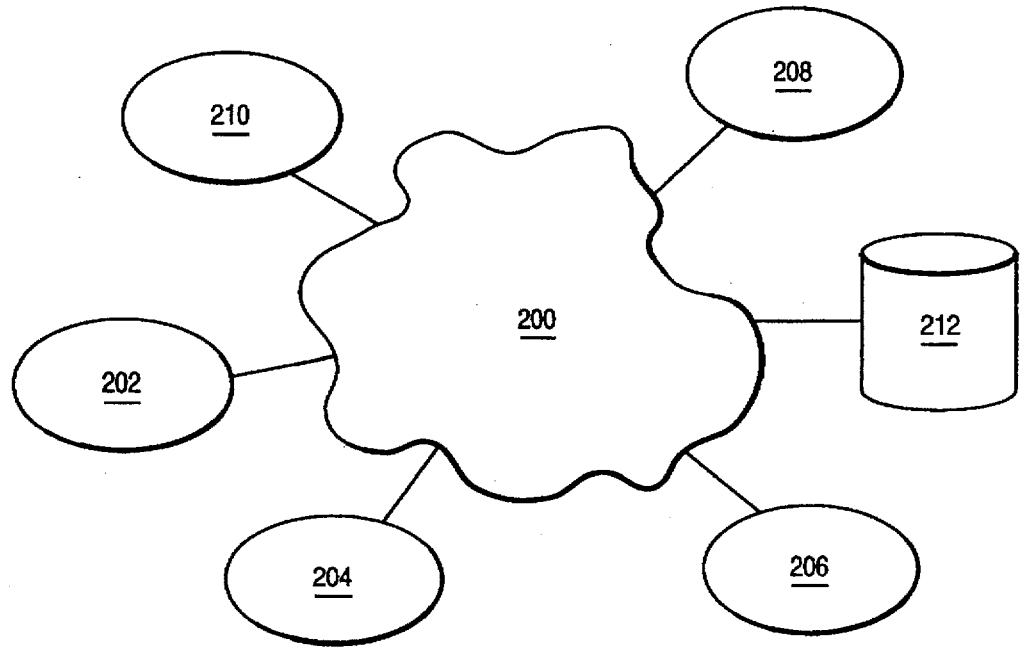
FIG. 2 is a block diagram of a distributed network according to the present invention.

A distributed processing system is shown in FIG. 2. Each of the processing nodes 202, 204, 206, 208, 210 is connected to a network 200 that enables communications among the processors. Additional permanent storage may be associated with the network as shown by disk storage unit 212. In the alternative, persistent storage in one of the processing nodes could be used for network persistent storage.

Network 200 can be any type of network including LAN, WAN, ATM or other. Physical network protocols such as Ethernet or Token Ring can be used and communications protocols such as TCP/IP or Netbios or Novell Netware can control the network. Network file system management can be provided by a program based on the Sun Microsystems NFS technology or CMU AFS technology. Each of these file system programs allows distributed processes to access and manage data residing on remote systems. These systems create a single logical file system for each processor regardless of the physical location of individual files. NFS is described in greater detail in the IBM Corp. publication *Communication Concepts and Procedures*, Order No. SC23-2203-00.

The variety of permitted networks means that the processing nodes may be distributed throughout a building, across a campus, or even across national boundaries.

The preferred embodiment of the present invention is practiced in a distributed network of peer processing nodes. Peer nodes each have equal status in the network with none being master or slave nodes. Using peer nodes improves network efficiency because there is no single bottleneck through which requests must be funnelled. Instead each node can act independently to perform its functions. Another advantage is that failure of any particular node will not cause the entire network to fail as would be the case where a master processor existed. The disadvantage of peer networks is that there is no focal point for controlling data integrity of replicated data.

Figure 3:
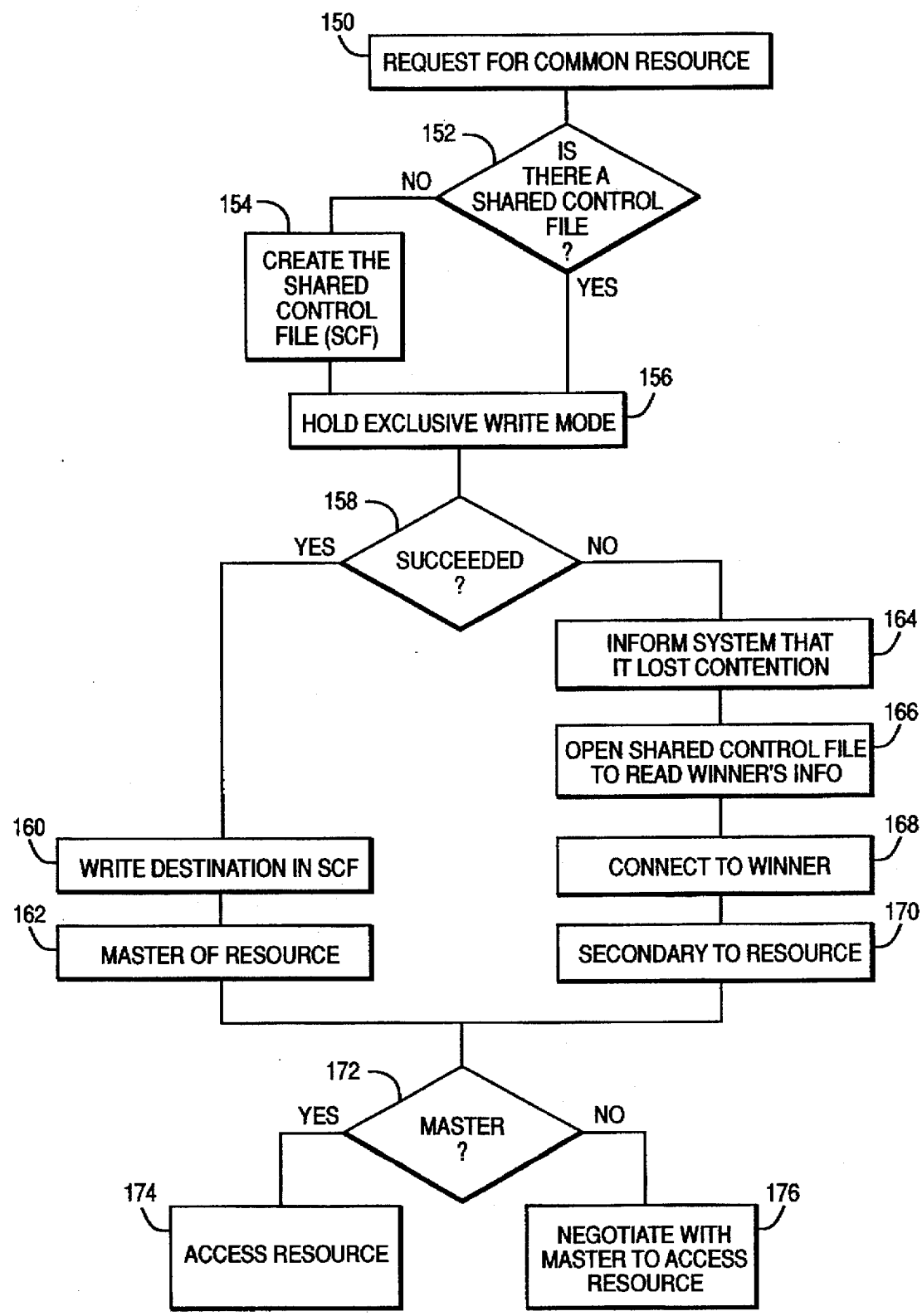
FIG. 3 is a flowchart depicting the master resolution logic of prior art systems.

The above referenced patent application for *Determining the Winner of a Race in a Data Processing System* teaches a procedure for "racing" for control of a resource. FIG. 3 illustrates the steps of this process. The process starts by generating a request for a common resource 150. The processor requesting the resource tests to determine whether or not a shared control file exists 152. If not, the process creates a shared control file 154. In either case, the process attempts to acquire exclusive write access 156. If this is successful 158 the system updates the shared control file 160 and is becomes master of that resource 162. If the attempt to acquire the exclusive write lock failed, the process is not the master 164 and must read the name of the master from the shared control file 166 and connect to the master 168 as a shadow 170. If the requesting process is the master, it can directly access the resource, otherwise, it is a shadow process and must negotiate with the master for access 176.

The shared control file of the preferred embodiment is a storage file in the logical file system. As such, it resides on one of the permanent storage devices in the distributed system. The present invention is equally applicable, however, to a shared resource control file managed in volatile memory (RAM) that is sharable among the distributed processes.

The system described in the above patent application provided handling for master process failure by reinitiating the control race. This approach has several disadvantages. First, only those processes that know about the failure of the master will participate in the race. Shadow processes will find out about master failure in a number of ways. Some communication systems, such as NFS will notify any process linked to a failing process of that process failure. In this case the shadow process will be quickly notified. In other cases shadow processes will detect master failure only when the shadow process attempts to communicate with the master. A shadow process that is read intensive may not contact the master for long periods and thus will not participate in the race.

A second disadvantage exists after the new master process is established. The new master has no knowledge of the shadow processes previously accessing the shared resource. These shadows will not necessarily become aware of the master process failure until they attempt to communicate with that process, fail, and seek to determine the new master.

The process of the preferred embodiment will be described with reference to FIG. 4. The process starts when one or more shadow processes detect master process failure 202. These processes will then "race" to determine which will be the new master process by attempting to gain exclusive control of a shared control file 204. The new master process is determined as the process first acquiring exclusive access to the shared control file 206. The new master process then reads and marks the existing shared control file as invalid 208.

The data in the shared control file includes the communication address for each of the shadow processes accessing the shared resource. A message is sent to each of these processes indicating master process failure and a need to reregister 210. A new shared control file is created by the new master and data about each shadow processes added to the file 212. An example of a shared control file record is shown in FIG. 5. The preferred embodiment implements the shared control file as a single record having an array containing all shadow process communication addresses. Alternatives, such as linked lists of shadows could also be implemented.

Figures 4, 5:
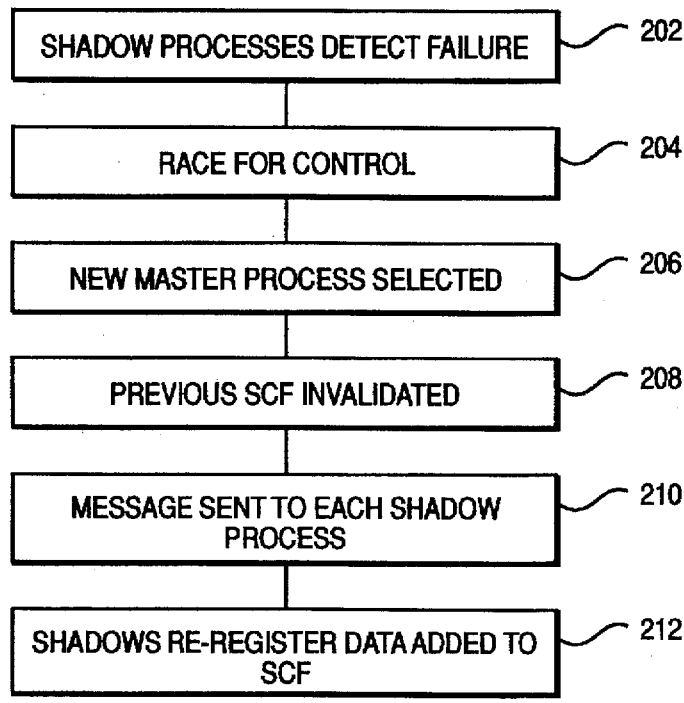
FIG. 4 is a flowchart of the preferred embodiment failure recovery logic.
FIG. 5 is a diagram showing the shared control file according to the preferred embodiment.

The shared control file table of FIG. 5 contains a master process machine identifier 222, a master process id 224, a master port number 226, a master protocol id 228, and a series of shadow ids 230 (containing machine and process ids) and shadow communications data 232 containing port and protocol information.

The master process maintains the shared control file by adding shadow data as shadows request access to the shared resource and removing the data from the table when they cease accessing the resource. Master process maintenance of a single is a distinct advantage over prior art systems that required sending the identities of all shadow processes to all other processes for use in the event of master process failure.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A computer program product having a computer readable medium having computer program logic recorded thereon for causing a computer system to detect a master process failure in system having a plurality processes each controlled by a separate operating system and a plurality of shared resources each controlled by a master process and to notify all other processes of master process failure, the computer program product comprising:

program product means for causing said computer system to detect failure of a master process for a shared resource;

program product means for causing said computer system to request exclusive access to a shared resource control file using a network file management system procedure independent of said operating system for said processor;

program product means for causing said computer system to establish exclusive access to said shared resource control file, if said request is granted;

program product means for causing said computer system to determine from said control file the communications addresses of all other processes accessing said shared resource via the failed master process;

program product means for causing said computer system to invalidate said control file;

program product means for causing said computer system to send a message to each of said other processes indicating failure of said master process.

2. The computer program product of claim 1, further comprising:

program product means for causing said computer system to create a new control file and enter data for each process responding to said messages.

3. The computer program product of claim 2, wherein said program product means for detecting failure comprises:

program product means for causing said computer system to attempt to communicate with a master process for a shared resource; and program product means for causing said computer system to signal master process failure if no response is received.

* * * * *